US009696874B2

(12) United States Patent
Kulick et al.

(10) Patent No.: US 9,696,874 B2
(45) Date of Patent: Jul. 4, 2017

(54) PROVIDING MEDIA TO A USER BASED ON A TRIGGERING EVENT

(71) Applicant: Google Inc., Mountain View, CA (US)

(72) Inventors: Matthew Kulick, San Francisco, CA (US); Aparna Chennapragada, Mountain View, CA (US); Albert Segars, San Francisco, CA (US); Hartmut Neven, Malibu, CA (US); Arcot J. Preetham, Cupertino, CA (US)

(73) Assignee: GOOGLE INC., Mountain View, CA (US)

( * ) Notice: Subject to any disclaimer, the term of this patent is extended or adjusted under 35 U.S.C. 154(b) by 266 days.

(21) Appl. No.: 14/144,745

(22) Filed: Dec. 31, 2013

(65) Prior Publication Data

US 2014/0344688 A1 Nov. 20, 2014

Related U.S. Application Data

(60) Provisional application No. 61/823,197, filed on May 14, 2013.

(51) Int. Cl.
*G06F 3/0482* (2013.01)
*G06F 17/30* (2006.01)

(52) U.S. Cl.
CPC ........ *G06F 3/0482* (2013.01); *G06F 17/3087* (2013.01); *G06F 17/30265* (2013.01); *G06F 17/30867* (2013.01)

(58) Field of Classification Search
CPC ........... G06F 17/30867; G06F 17/3087; G06F 17/30029; G06F 17/30038;
(Continued)

(56) References Cited

U.S. PATENT DOCUMENTS 9,110,903 B2 * 8/2015 Martinez ........... G06F 17/30035
2008/0205789 A1 * 8/2008 Ten Kate ................ G06T 11/60
382/284
(Continued)

FOREIGN PATENT DOCUMENTS

EP 1703426 9/2006
JP 2012090190 5/2012
WO WO2008156558 12/2008

OTHER PUBLICATIONS

Selonen, et al. "Mixed Reality Web Service Platform" Multimedia Systems, Springer, Berlin, DE, vol. 18, No. 3, pp. 215-230 Nov. 27, 2011.

(Continued)

*Primary Examiner* — Doon Chow
*Assistant Examiner* — Wendy Nicholas
(74) *Attorney, Agent, or Firm* — Middleton Reutlinger

(57) ABSTRACT

Methods and apparatus related to determining a triggering event of a user, selecting media relevant to the triggering event, and providing the selected media to the user. Some implementations are directed to methods and apparatus for determining a past event of the user that is indicative of past interaction of the user with one or more past entities and the triggering event may be determined to be associated with the past event. The media selected to provide to the user may contain media that includes the one or more past entities associated with the past event and the media may be provided to the user in response to the triggering event.

21 Claims, 5 Drawing Sheets

(58) Field of Classification Search
CPC .............. G06F 17/30056; G06Q 50/01; G06Q 30/0252; G06Q 30/0278; G06Q 30/06; G06K 9/00677; H04L 12/1895; H04L 51/20; H04L 67/18
USPC ....... 715/774, 716, 712, 719, 963, 814, 844, 715/703, 708, 202, 751; 707/E17.109, 707/E17.009, E17.014, E17.017, E17.018, 707/724, 769, 603; 705/14.66; 709/204, 709/206

See application file for complete search history.

(56) References Cited

U.S. PATENT DOCUMENTS

| | | | |
|---|---|---|---|
| 2008/0215984 A1 | 9/2008 | Manico et al. | |
| 2009/0293013 A1* | 11/2009 | O'Shaugnessy | G06F 3/0485 715/810 |
| 2010/0211575 A1* | 8/2010 | Collins | G06F 17/30044 707/749 |
| 2010/0241623 A1 | 9/2010 | Acker et al. | |
| 2011/0282942 A1 | 11/2011 | Berger et al. | |
| 2011/0283172 A1 | 11/2011 | Berger et al. | |
| 2011/0314482 A1* | 12/2011 | Cupala | G06F 17/30899 719/328 |
| 2012/0054589 A1 | 3/2012 | Berger et al. | |
| 2012/0215771 A1* | 8/2012 | Steiner | G06F 17/30528 707/723 |
| 2012/0314912 A1* | 12/2012 | Nakagomi | G06F 17/30613 382/115 |
| 2012/0329025 A1* | 12/2012 | Yang | G09B 5/06 434/322 |
| 2013/0058577 A1 | 3/2013 | Stubler et al. | |
| 2013/0198652 A1* | 8/2013 | Dunn | G06F 3/0484 715/751 |
| 2014/0022265 A1* | 1/2014 | Canan | G06F 17/30244 345/522 |
| 2014/0280108 A1* | 9/2014 | Dunn | G06F 17/30699 707/728 |

OTHER PUBLICATIONS

International Search Report and Written Opinion of PCT Serial No. PCT/US14/00126 Sep. 19, 2014.

* cited by examiner

PROVIDING MEDIA TO A USER BASED ON A TRIGGERING EVENT

CROSS-REFERENCE TO RELATED APPLICATIONS

This application claims the benefit of U.S. Provisional Application Ser. No. 61/823,197, filed May 14, 2013, and entitled "Providing Media to a User Based on a Triggering Event", which is hereby incorporated by reference in its entirety.

BACKGROUND

This specification is directed generally to determining a triggering event of a user, selecting media relevant to the triggering event, and providing the selected media to the user.

A user may have access to a number of media (photos or videos) that remind the user of past experiences and/or that may inform a user's current or upcoming experiences. For example, photos of the user and/or other photos may be accessible to the user that remind the user of a recent trip to Paris. However, a user may infrequently search for such photos, may be unable to locate such photos, and/or may not recognize such photos may remind the user of past experiences and/or inform the user of current or upcoming experiences.

SUMMARY

The present disclosure is directed to methods and apparatus for determining a triggering event of a user, selecting media relevant to the triggering event, and providing the selected media to the user. In some implementations, a past event of the user may be determined that is indicative of past physical interaction of the user with one or more past entities (e.g., locations, people) and the triggering event may be determined to be associated with the past event. The media selected to provide to the user may contain media that includes the one or more past entities associated with the past event and the media may be provided to the user in response to the triggering event. For example, the determined triggering event may be the receipt of an e-mail confirming a user's purchase of tickets to an annual music festival. The triggering event is indicative of future interaction of the user with the entity associated with the annual music festival. The past event may be attendance of the user at the annual music festival in a previous year and the past event entities may include an entity associated with the annual music festival. The past event and the triggering event may be determined to be associated since they both relate to the same annual music festival. The media provided to the user may include photos from the annual music festival and may be provided in response to the triggering event (in response to receipt of the e-mail).

In some implementations a computer implemented method may be provided that includes the steps of: identifying data associated with a user, the data including data non-associated with media that is indicative of user interactions with one or more entities; determining a past event of the user based on the data non-associated with media, the past event indicative of past interaction of the user with one or more past event entities of the entities; determining a triggering event based on the identified data; determining an association between the past event and the triggering event; identifying media that include one or more of the past event entities; selecting one or more of the identified media; and providing the selected media to a computing device of the user in response to the triggering event.

This method and other implementations of technology disclosed herein may each optionally include one or more of the following features.

The method may further include determining one or more triggering event entities associated with the triggering event, where the selection of the identified media may be based at least in part on relevance of the identified media to the triggering event entities.

In some implementations identifying media that include one or more of the past event entities may further include identifying metadata associated with the media and matching the metadata to the one or more of the past event entities. In some implementations matching the metadata to the one or more past event entities may include identifying a mapping between the metadata and the one or more past event entities in a database. In some implementations the media may include a given photo, and metadata for the given photo of the media may include at least one of a title of an album to which the given photo may belong, a photo tag that may be associated with the given photo, and entity recognition metadata that may be based on image analysis of the given photo.

In some implementations selecting one or more of the identified media may further include identifying a category of the triggering event, identifying one or more selection criteria for the media, where the selection criteria may be based on the category of the triggering event, and selecting the one or more identified media based on the selection criteria. In some implementations the category of the triggering event may be a location based category, where the selection criteria may include criteria related to a location associated with the media. In some implementations the selection criteria for a first category of the category may include a plurality of selection criteria and associated weightings, where the selection criteria for a second category of the category may include one or more same of the selection criteria with an associated weighting that is unique from the associated weighting of the same of the selection criteria for the first category.

In some implementations selecting one or more of the identified media may further include identifying acquaintances of the user and increasing the likelihood of selecting a given photo of the media if the given photo includes one or more of the identified acquaintances of the user. In some implementations one or more of the identified acquaintances of the user may be included in the past event entities.

In some implementations determining the triggering event of the user based on the identified data may further include identifying multiple sources of data indicative of at least one of present and future interaction of the user with one or more triggering event entities. In some implementations determining an association between the past event and the triggering event may include determining an association between one or more of the triggering event entities and the past event entities.

In some implementations determining the triggering event of the user based on the identified data may further include identifying a frequency of occurrence of the one or more actions by the user that may be indicative of rare occurrence.

In some implementations providing the selected media to the computing device of the user in response to the triggering event may further include determining at least a threshold time period has elapsed since one or more media have been provided, in response to another triggering event, that include one or more of the past event entities of the selected media.

The past event entities may include a location of the past event and one or more acquaintances that attended the past event.

The triggering event may be a recurring event that becomes less frequent in occurrence as time from the past event increases.

The past event entities may include an acquaintance entity of one or more acquaintances that attended the past event and wherein the triggering event may be based on current or future interaction of the user with the acquaintance entity.

In some implementations a computer implemented method may be provided that includes the steps of: identifying data associated with a user; determining a triggering event of the user based on the identified data, the triggering event associated with one or more past, current, or future actions of the user; determining an association between the triggering event and one or more selected entities; identifying media that include one or more of the selected entities; selecting one or more of the identified media based on whether at least a threshold time period has elapsed since one or more media have been provided, in response to another triggering event, that include one or more of the selected entities; and providing the selected media to a computing device of the user based on the triggering event.

This method and other implementations of technology disclosed herein may each optionally include one or more of the following features.

The triggering event may be based on an anniversary date of a past event.

In some implementations determining the triggering event of the user based on the identified data may include identifying multiple sources of data indicative of at least one of present and future interaction of the user with the selected entities. In some implementations determining the triggering event of the user based on the identified data may include determining a past event indicative of interaction of the user with the selected entities.

Selected media may only be provided to the computing device if the threshold time period has elapsed.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein identify data associated with a user and determine a triggering event based on the identified data. The triggering event may be associated with past, present, and/or future actions of the user, such as interaction of the user with one or more selected entities. The triggering event represents a new event associated with the user that may be derived from the identified data of the user. Particular implementations of the subject matter described herein identify media that includes one or more entities associated with the triggering event and/or a past event, and select one or more of the identified media to provide to a computing device of the user. The selected media may be provided to a computing device of the user via one or more applications to provide an improved experience to the user.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
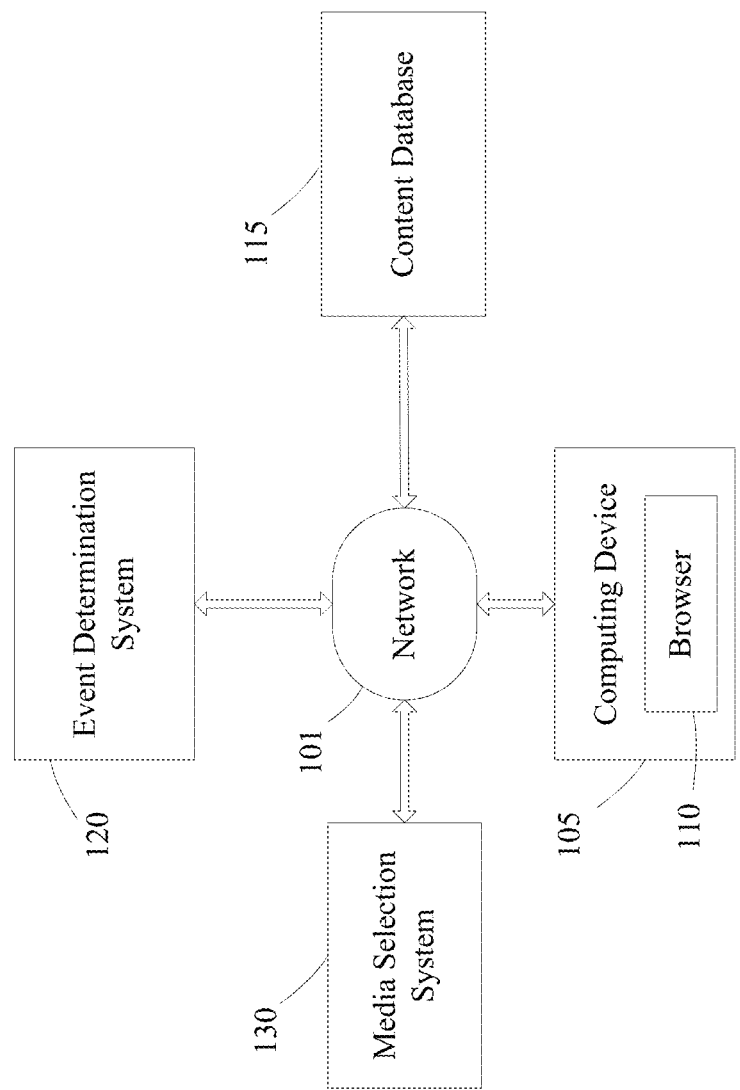
FIG. 1 is a block diagram of an example environment in which media may be provided to a user based on a triggering event.

FIG. 1 illustrates a block diagram of an example environment in which media may be provided to a user based on a triggering event. As used herein, the term media means photos or videos. A communication network 101 is provided that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques. The example environment also includes a computing device 105 with a browser 110; a content database 115; an event determination system 120; and a media selection system 130.

Media that is provided to a user based on a triggering event may be provided to the user via a computing device 105 of the user. For example, in some implementations the media may be provided to the user via a browser 110 executing on the computing device 105 and/or through one or more other applications executing on the computing device 105. Media may be provided via one or more graphical user interfaces (GUIs) such as the GUIs illustrated in FIGS. 4-6 and described in additional detail herein. Additional and/or alternative GUIs may be utilized.

Data associated with the user that is utilized to determine a past event of the user, that is utilized to determine a triggering event of the user, and/or that is utilized to select one or more media to provide to the user may be based on one or more user interactions via the computing device 105. For example, the computing device 105 and/or additional computing devices of the user may be utilized by a user to create and/or access one or more documents that may contain data pertinent to the user and/or that may be utilized to determine data pertinent to the user. For the purposes of this specification, a document is any content that is associated with a document address. Documents include webpages, word processing documents, portable document format (PDF) documents, images, video, audio, e-mails, calendar entries, task entries, and feed sources, to name just a few. The documents may include content such as, for example: words, phrases, pictures, audio, task identifiers, entity identifiers, etc.; embedded information (such as meta information and/or hyperlinks); and/or embedded instructions (such as JavaScript scripts).

In some implementations, the browser 110 may be utilized by the user to create and/or access one or more documents that may contain data pertinent to the user and/or that may be utilized to determine data pertinent to the user. For example, the user may access e-mail via the browser 110 that may contain user data that may be utilized to determine a past event and/or a triggering event. Also, for example, a user may access a user-edited document that contains user data that may be utilized to determine a past event and/or a triggering event. Also, for example, a user may create a calendar entry of the user that identifies an upcoming meeting, a task to be completed, and/or an approaching appointment that may be utilized to determine a past event and/or a triggering event. Also, for example, a user may create a post, upload images, and/or perform other actions via a social networking application that may be utilized to determine a past event and/or a triggering event. Computing device 105 may share one or more characteristics with the computing device illustrated in FIG. 7 and described herein.

Also, for example, data associated with the user may include location data of the user obtained via the computing device 105 and/or additional computing devices of the user. For example, location data may be obtained via a GPS device of the computing device 105, via check-ins or other user indicated visits to locations via the computing device 105, and/or via estimation of the location of the computing device 105 via cellular signals, Wi-Fi signals, and/or other radio-frequency (RF) signals. Any estimation of the location of the computing device 105 via RF signals may be made by the computing device 105 directly and/or via other computing devices.

Additional and/or alternative sources of data associated with the user that is utilized to determine a past event of the user, a triggering event of the user, and/or to select one or more media to provide to the user may be utilized. Data associated with the user may include data indicative of user interactions with one or more entities. In some implementations, entities are persons, places, concepts, and/or things that can be referred to by a text fragment (e.g., a term or phrase) and are distinguishable from one another (e.g., based on context). The data may directly indicate the one or more entities and/or may be utilized to identify the one or more entities. For example, a user may receive an e-mail from a company confirming a ticket purchase of the user to an upcoming music festival. One or more entities with which the user may interact in attending the upcoming music festival may be identified based on such an e-mail. For example, an entity associated with the music festival may be identified (e.g., based on an alias of the music festival contained in the e-mail); an entity associated with the location of the music festival may be identified (e.g., based on a database mapping between the entity associated with the music festival and the entity associated with the location of the music festival); and/or entities associated with one or more friends of the user that are planning to attend and/or have previously attended the music festival may be identified (e.g., based on further user data that indicates such friends of the user are attending the music festival). Also, for example, a user may create a calendar appointment for lunch with a long-lost friend at a local restaurant. One or more entities with which the user may interact during the appointment may be identified based on such a calendar appointment. For example, an entity associated with the long-lost friend may be identified (e.g., based on identification of the long-lost friend in the user's contacts list) and/or an entity associated with the local restaurant may be identified (e.g., based on an alias of the restaurant identified in the calendar appointment). Also, for example, a user may have taken a trip and various sources utilized to identify entities with which the user interacted during the trip. For example, location data of the user may be utilized to identify entities associated with one or more attractions visited by the user during the trip (e.g., based on a mapping between locations indicated by the location data and entities associated with the attractions in a database). Also, for example, images from the trip may be utilized to identify entities associated with one or more attractions visited during the trip and/or entities associated with one or more friends that went on the trip with the user (e.g., based on image analysis techniques to identify entities present in the images).

In some implementations, an entity may be referenced by a unique entity identifier that may be used to identify the entity. The unique entity identifier may be associated with one or more properties associated with the entity and/or with other entities. For example, in some implementations one or more entity databases may include properties associated with unique identifiers of one or more entities. For example, for each of a plurality of entities, a mapping (e.g., data defining an association) between the entities and one or more properties and/or other entities related with the entity may be identified in the entity database. For example, a unique identifier for the entity associated with "LAX" may be associated with a name or alias property of "LAX," another alias property of "Los Angeles International Airport" (an alternative name by which LAX is often referenced), a phone number property, a location property, and/or an entity type property of "airport" in the entity properties database. Additional and/or alternative properties may be associated with an entity in one or more databases such as an entity database.

Data associated with the user may be stored in one or more databases such as content database 115. The content database 115 may include one or more storage mediums. In this specification, the term "database" will be used broadly to refer to any collection of data. The data of the database does not need to be structured in any particular way, or structured at all, and it can be stored on storage devices in one or more geographic locations. Thus, for example, the content database 115 may include multiple collections of data, each of which may be organized and accessed differently.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. Also, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and/or used.

Generally speaking, in some implementations, the event determination system 120 may identify one or more past events and/or triggering events of the user based on data associated with the user. A past event is an event associated with a past interaction of the user with one or more entities and is identified based on the user data. A triggering event is some identifiable occurrence after a past event that is associated with the past event. In some implementations the triggering event is based on a passage of time since the past event. In some implementations the triggering event is based on one or more present or anticipated actions of the user that are associated with the past event and are identified based on the user data. In some implementations the triggering events may be indicative of present and/or future interactions of the user with one or more entities related to entities of the past event. The media selection system 130 identifies one or more media, such as photos, that include the one or more entities related to the past event and selects one or more of the identified media utilizing one or more criteria. Selected media are then provided to the user via the computing device 105 based on of the triggering event. The photo selection system 130, the event determination system 120, and/or other system may provide the selected media to the computing device 105.

As discussed, in some implementations the event determination system 120 may identify one or more past events of the user based on data associated with the user. In determining a past event, one or more properties of the past event may be determined. For example, a time and/or date of the past event may optionally be determined. Also, for example, in determining a past event one or more past event entities with which the user interacted during the past event may be determined. For example, one or more people, places, and/or objects with which the user interacted during the past event may be determined.

In some implementations a past event may be a significant past event of the user. Significant past events may include certain defined events of a user such as the birth of a child, a wedding, an engagement, starting college, graduating from college, moving to a new city, getting a new job, buying a house, buying a car, getting a pet, a previous vacation, etc. Determining the occurrence of and/or details about a significant past event may be based on data associated with the user. For example, a wedding of a user may be identified based on a social networking profile of the user that indicates a wedding date; receipts received via e-mail that indicate rental of tuxedos, a wedding venue, and a limousine; data from other users indicating they attended the wedding of the user; etc. Dates and/or past entities associated with the wedding may be determined from similar and/or alternative sources. For example, groomsmen in the wedding party may be identified based on a bridal party listing of a wedding webpage associated with the user. Also, for example, a vacation of a user may be identified based on data from e-mail or other accounts of a user that indicate purchase of tickets to an event, purchase of flights to a location, reservations to a hotel, and/or purchases of other items indicating a vacation (e.g., purchase of ski lift tickets, scuba gear rentals). Dates and/or past entities associated with the vacation may be determined from similar and/or alternative sources. For example, an e-mail to the user that is a confirmation of a flight reservation to the location may include a listing of other individuals that are also included in the flight reservation.

In some implementations a determined past event is considered a significant past event if it conforms to a defined significant past event (e.g., wedding, birth of a child). In some implementations whether a determined past event is considered a significant past event may additionally and/or alternatively be based on other factors. For example, if the event is determined to be a rare occurrence for the user and multiple sources of data mention the event, then the event may be considered a significant event. For example, for a user who rarely travels, a distant trip to Paris may be considered a significant event if multiple sources of data mention the event such as posts of the user, photographs of the user, posts from friends of the user, multiple e-mails of the user, etc. On the other hand, for a user who frequently travels to multiple countries through work, a distant trip to Paris that does not include multiple sources of data mentioning the event may not be considered a significant event since the user's previous trips and the lack of prominent mention of the trip indicate it was likely another business trip of the user. Determining whether an event is a rare occurrence of a user may be based on determining the frequency with which the user engages in the event and/or similar events. For example, whether a vacation to a location is a rare event may be based on the frequency with which the user vacations in general and/or the frequency with which the user vacations at the location.

In some implementations a past event of a user may be a past visit of the user to a location that is not necessarily a significant past event. For example, a trip of a user to a location may be determined based on data from e-mail or other accounts of a user that indicate purchase of tickets to an event at the location, purchase of flights to the location, reservations to a hotel at the location, reservations for a rental car at the location, and/or location data indicating travel to the location and/or presence at the location for at least a threshold amount of time. Dates and/or past entities associated with the past visit may be determined from similar and/or alternative sources.

In some implementations a past event of a user may be a past purchase of a user. For example, a past purchase of a particular bottle of wine by a user may be determined based on data from e-mail or other accounts of a user that indicate purchase of the wine. Also, for example, a past purchase of a particular bottle of wine by a user may be determined based on a document of the user that indicates wines that the user has purchased and/or consumed. Also, for example, a past purchase of a particular bottle of wine by a user may be determined based on a photo of the bottle of wine taken by the user. Dates and/or past entities associated with the purchase may be determined from similar and/or alternative sources. For example, an e-mail that is a receipt for a purchase of a bottle of wine may include information that may include an identifier of the purchase date, and identifier of the bottle of wine, and/or an identifier of the particular store from which the bottle of wine was purchased.

In some implementations a past event of a user may be a past meeting with friends or other acquaintances of the user. For example, a past meeting with a friend of the user may be determined based on a social networking post of the user indicating the user was at a particular location with the friend.

In some implementations a past event of a user may be a past photo or other media generated by the user. For example, the user may take a photo of a parking spot of a car of the user utilizing a mobile computing device (e.g., a mobile phone). The photo may include metadata that identifies the date and time the photo was taken and the location at which the photo was taken.

In some implementations a past event of a user may be a hobby in which the user has been engaged. For example, a user profile of the user may identify one or more hobbies in which the user has been engaged. The entity associated with the hobby and/or additional entities associated with the hobby may be identified. For example, the user profile may identify the user is a bird watcher. Also, for example, past photos taken by the user may be analyzed to identify that the user is a bird watcher based on a large number of the images including birds. Additional and/or alternative past events of a user may be determined.

As discussed herein, past events may be determined based at least in part on user data that is data non-associated with a photo or other media. For example, user data utilized to determine a past event may be data that is identified independent of any association of the data with media. Such data non-associated with media includes various data described herein such as, for example, data from a social networking profile of a user, data from a webpage or other document associated with a user, data from e-mail of a user, data from other electronic communications of the user such as text messages, data from purchases of a user, location data of a user, data from reservations of a user, receipt data of a user, and hobby data of the user.

Also, as discussed, in some implementations the event determination system 120 may identify one or more triggering events. A triggering event is some identifiable occurrence after the past event that is associated with the past event. In some implementations the event determination system 120 may additionally determine an association between the triggering event and one or more past events. In some implementations an association between the triggering event and one or more past events may be determined based on similarity between entities associated with the triggering event and the past events. For example, a past event associated with a particular acquaintance of the user may be determined to be associated with a triggering event of the user that is also associated with the particular acquaintance. Also, for example, a past event associated with a particular location having a property may be determined to be associated with a triggering event that is associated with another location also having that property. For example, a past event trip to an art gallery in Chicago may be determined to be associated with a triggering event based on a visit to an art gallery in Paris based on both locations being art galleries. Also, for example, a past event associated with a purchase of a particular item may be determined to be associated with a triggering event that is associated with a location that sells similar items based on both the previous purchase and the location being associated with similar items.

In some implementations an association between the triggering event and one or more past events may be determined based on the triggering event being based on the past event itself. For example, in implementations where the triggering event is based on passage of time since the past event, the triggering event and the past event may be determined to be associated with one another. In some implementations an association between the triggering event and one or more past events may be based on user data that indicates the triggering event and the past events are related. For example, the user may move a received e-mail that is utilized to determine a triggering event into a particular folder and the moving of the e-mail to the particular folder may indicate the triggering event is associated with past events determined via other e-mails in the folder, past events associated with a title of the folder, etc.

In some implementations a triggering event may be determined based on the passage of time since occurrence of a past event, such as a significant past event. A triggering event for a past event may be based on an anniversary of the past event. For example, the triggering event for a wedding of a user could be reaching a date that is one year since the wedding and/or reaching a date that is X days before the one year anniversary of the wedding. In some implementations the triggering event based on the passage of time since occurrence of a significant past event may be a recurring event (one year since the wedding, two years since the wedding, etc.). In some implementations any recurring triggering event may become less frequent in occurrence as time from the past event increases. For example, the triggering event for a wedding of a user could recur every year for the first five years from the wedding date, and then only recur every five years.

In some implementations the triggering event is based on one or more present or anticipated actions of the user that are associated with the past event and are identified based on the user data. In some implementations the triggering event may be indicative of present and/or future interactions of the user with one or more entities that are related to entities of the past event. For example, in some implementations a triggering event may be based on identification of the presence of the user at a present location that is determined to be associated with a past location of the past event. For example, the present location may be the same location as the past location. Also, for example, the location at which the user is present may be similar to the past location. For example, the present location may be nearby the past location. Also, for example, the present location may be of a similar type as the past location (e.g., both art museums).

Also, for example, in some implementations a triggering event may be based on receipt of an e-mail or other electronic communication. For example, in some implementations a triggering event may be based on receipt of an e-mail from a long-lost friend. In some implementations the triggering event may be associated with one or more past events based on the long-lost friend also being associated with the one or more past events. Also, for example, in some implementations a triggering event may be based on receipt of an e-mail that is a receipt of a recent purchase. In some implementations the triggering event may be associated with one or more past events based on the item purchased being similar to other items purchased in one or more past events. Also, for example, in some implementations a triggering event may be based on receipt of a text message that includes the word "meet" or similar word indicating a likely meeting with the individual sending the text message. In some implementations the triggering event may be associated with one or more past events based on the individual sending the text message also being associated with the past events.

In some implementations a triggering event may be based on a calendar entry, a task entry, and/or a general reminder entry. For example, in some implementations a triggering event may be based on a calendar entry indicating a meeting with a business acquaintance. In some implementations the triggering event may be associated with one or more past events based on the business acquaintance also being associated with the one or more past events. Also, for example, a task entry may relate to booking a particular trip. In some implementations the triggering event may be associated with one or more past events based on the particular trip being associated with similar people with which a past event trip was taken and/or being taken close to the anniversary date of the past event trip.

In some implementations a triggering event may be based on the ending of a past event. For example, the ending of a past event may be recognized based on a significant change in location data associated with a user and may be associated with the past event based on proximity in time to the past event. Also, for example, the ending of a past event may be recognized based on an indication of the duration and/or stop date of a past event and may be associated with the past event based on such an indication.

In some implementations whether a user action is considered a triggering event may additionally and/or alternatively be based on whether the one or more present or anticipated actions of the user are relatively rare occurrences for the user. For example, if the present or anticipated actions of the user are relatively rare occurrences of the user, then the actions may constitute a triggering event. For example, if travel to a particular location such as a vacation spot is a relatively rare occurrence, a triggering event may be determined based on such travel. On the other hand, if travel to a particular location such as work is a relatively common experience, a triggering event may not be determined based on such travel. In some implementations whether a user action is considered a triggering event may additionally and/or alternatively be based on the number of sources indicating the user action. For example, a user's arrival at a location, standing alone, may not be sufficient to constitute a triggering event based on such arrival. However, if calendar entries, social networking posts, e-mails, and/or other sources of data also relate to the user's arrival at the location, they collectively may be sufficient to identify a triggering event based on such arrival. For example, standing alone, a user's arrival at a restaurant may not be sufficient to constitute a triggering event. However, if a social networking post of the user relates to an anticipated trip to the restaurant and a calendar entry indicates that a close acquaintance of the user is also going to the restaurant, the user's arrival the restaurant may constitute a triggering event.

In some implementations a triggering event may be determined based on a single data source such as one or more of the sources described herein. In some implementations a triggering event may be determined based on a combination of one or more sources such as those described herein. For example, a triggering event may be determined based on a user's arrival at a location only if an additional source indicates the location is important to the user. For example, an e-mail receipt may indicate that arrival at the location is to attend a popular event. Also for example, a triggering event may be determined based on an e-mail receipt for a particular event only if an additional source indicates the event is important to the user. For example, social media posts of the user may indicate the event is important to the user. Also, as discussed herein, in some implementations a triggering event may be determined based on a category of the past event. For example, a triggering event based on the passage of time may be appropriate for a significant past event such as a wedding, but not appropriate for less significant past events such as attending a concert. Also, for example, a triggering event based on arrival at a location related to a past event location may be appropriate if the past event location is a significant past event location such as an alma matter of the user, but not appropriate for less significant past event locations such as a location of a friend's wedding.

In some implementations the triggering event is based on one or more present or anticipated actions of an acquaintance of the user. Such triggering events may be identified, for example, based on data associated with the acquaintance, such as publicly available data and/or data that the acquaintance has chosen to enable the user to access. Acquaintances may include friends or other social connections of the user and may be identified, for example, based on social networking data of the user, a contact list of the user, and/or analysis of photos of the user. In some implementations the triggering event may be indicative of present and/or future interactions of one or more acquaintances of the user with one or more entities that are related to entities of the past event. For example, in some implementations a triggering event may be based on identification of the presence of a friend of the user at a present location that is determined to be associated with a past location of the past event. For example, the present location may be the same location as the past location. Also, for example, in some implementations a triggering event may be based on a friend of the user taking a photo that is determined to include an entity that is associated with an entity of the past event. For example, the friend may take a photo in front of the Eiffel Tower and, based on analysis of the photo, it may be determined the photo includes the Eiffel Tower and is associated with a past event trip of the user to the Eiffel Tower. Also, for example, the friend may take a photo in front of the Eiffel Tower and, based on location data associated with the photo, it may be determined the photo was taken in Paris and that the photos is associated with a past event trip of the user to Paris.

In some implementations the triggering event may additionally and/or alternatively be based on additional and/or alternative actions of acquaintances of the user. For example, additional actions of acquaintances of the user on which triggering events may be based may include one or more of the actions described herein with respect to the user (e.g., calendar entry of the acquaintance, receipt of an e-mail by the acquaintance). Whether an action of an acquaintance of the user is considered a triggering event may additionally and/or alternatively be based on whether the one or more present or anticipated actions of the acquaintance are relatively rare occurrences for the acquaintance. Also, in some implementations a triggering event based on an acquaintance of the user may be determined based on a single data source and/or a combination of one or more sources such as those described herein.

The media selection system 130 identifies one or more media, such as photos, that include the one or more entities related to the past event and selects one or more of the identified media utilizing one or more criteria. Selected media are then provided to the user via the computing device 105 based on the triggering event. In some implementations media may be identified via one or more database such as content database 115. In some implementations content database 115 may include an index of photos. Images may be indexed based on identifiers of the photos and one or more properties of the photos such as, for example, entities present in the images, prominence of entities present in the images, dates of the images, locations of the images, quality of the images, and/or source(s) of the images.

Media may be identified from the user's own media, from media of acquaintances of the user who have chosen to share the media with the user, and/or through publicly available media. For example, media may be selected from the user's own online photo albums, photo albums of friends of the user that have been shared with the user, and/or from publicly available photo albums. In some implementations the identified media may include media that is identified as including and/or being related to one or more past event entities and/or one or more entities that may be associated with the triggering event. Various techniques may be utilized to determine whether media includes or is related to a given entity. For example, metadata associated with a photo may be utilized to determine if the photo includes and/or relates to a given entity. Metadata associated with a photo may include, for example, tags associated with the photo, tagged locations associated with the photo, characteristics of one or more people that have shared the photo, the originator of the photo, timestamp data associated with the photo, results of image analysis performed on the photo, title of an album containing the photo, etc. Similar and/or additional metadata may be associated with other types of media.

As an example, a tag associated with a photo may be "Eiffel Tower" and image analysis performed on the photo may identify the photo as including the Eiffel Tower. Accordingly, the image may be identified as including the Eiffel Tower. Also, as another example, a photo may be included in the user's album "Paris Trip 2010" and may have been tagged by the user as including the spouse of the user. Accordingly, the image may be identified as including the spouse of the user and including content from the user's 2010 trip to Paris. Also, as another example, a photo may be included in the user's album "Paris Trip 2010" and may be associated with location data corresponding to the Eiffel Tower. Accordingly, the image may be identified as including the Eiffel Tower and including content from the user's 2010 trip to Paris. Also, as another example, a photo may be associated with a venue location that hosts multiple events and may include timestamp data. Accordingly, the image may be identified as including the venue and may also optionally be identified as including the particular event taking place at the venue at that time. The particular event may be identified, for example, via a webpage or other data source providing a listing of events at the venue and/or via analysis of other photos taken at the same time and same location that may include descriptors of the event.

In some implementations one or more databases may be utilized to identify an entity included in a photo or other media. For example, a photo may be tagged with a comment from the user that says "My trip to the City of Lights" and an entity database may be utilized to determine "City of Lights" is an alias associated with the entity associated with the City of Paris in France. Also, for example, a user may tag a friend in a photo using a nickname and a contacts listing of the user may be utilized to determine the nickname corresponds to a particular individual in the user's contacts list. Also, for example, a photo may be analyzed to determine that it includes the Eiffel Tower and an entity database may be utilized to determine the Eiffel Tower is in the $7^{th}$ arrondissement in Paris, France. Accordingly, the photo may be associated with the Eiffel Tower, the $7^{th}$ arrondissement, Paris, and France.

In some implementations whether identified media is selected to provide to a user may be based on whether the identified media is from any past event associated with the triggering event. For example, in some implementations at least one piece of media from the past event may be selected to provide to the user. For example, if the past event is a vacation, then at least one photo from the actual vacation should be selected to be provided. Determination of whether the photo is from the actual vacation may be based on metadata associated with the photo. For example, the photo may be time stamped with a known date of the vacation, may have been taken by the user, and may include one or more individuals who are known to have gone on the vacation.

In some implementations whether identified media is selected to provide to a user may be based on the age of the media. For example, in some scenarios it may be desirable to include photos from multiple time periods to show a progression. For example, when the triggering event is the anniversary of the birth of a child, it may be desirable to include a photo from the date of birth, a photo when the child was 1 year old, a photo when the child was 2 years old, etc. Also, for example, when the triggering event is the end of a trip it may be desirable to include photos from each day of the trip. Determination of the age of the photo may be based on metadata associated with the photo such as timestamp information.

In some implementations whether identified media is selected to provide to a user may be based on the location associated with the media. For example, in some scenarios photos that include a location of the past event and/or triggering event may be favored. For example, for a past event that involves a trip to Chicago with a friend, photos that include the friend and were taken in Chicago may be more likely to be selected than photos that include the friend and were taken elsewhere. Determination of the location of the photo may be based on metadata associated with the photo such as automatically tagged location data and/or user tagged location data (e.g., identifying a point of interest).

In some implementations whether identified media is selected to provide to a user may be based on the people associated with the media. For example, in some scenarios photos that include one or more person that is associated with the user, associated with the past event, and/or associated with the triggering event may be favored. For example, for a past event that involves a trip to Chicago, photos that include a friend of the user and were taken in Chicago may be more likely to be selected than photos that were taken in Chicago but do not include the friend. Determination of people associated with the user may be based on user data such as the user's social networking friends, the user's contact list, etc. Determination of the people in a photo may be based on metadata associated with the photo such as automatically tagged individuals based on image analysis and/or user tagged individuals.

In some implementations whether identified media is selected to provide to a user may be based on whether the identified media will add to the diversity of the selected media being provided to the user. For example, if other selected photos to provide to the user in response to the triggering event include people and/or locations A-E, then photos that include people and/or locations F-H may be more likely to be selected than photos that just include one or more of people and/or locations A-E.

In some implementations whether identified media is selected to provide to a user may be based on whether the identified media includes entities that are relatively rare to the user based on the data associated with the user. For example, if a location, person, and/or point of interest in a photo is relatively rare to the user, then the photo may be more likely to be provided to the user. For example, if a first photo is a picture of the user and a friend taken at the user's house and the second photo is a picture of the user and the friend taken at a location 300 miles from the user's house that the user has only visited once, the second photo may be more likely to be provided since it was taken at a location that is rare to the user, whereas the first photo was taken at a very common location of the user.

In some implementations whether identified media is selected to provide to a user may be based on time passage since entities included in the identified media have been provided to the user with media in response to another triggering event. For example, if a first photo is from a first vacation at a first location, a second photo is from a second vacation at a second location, and another photo was provided to the user earlier in the week that was from the first vacation at the first location, the second photo from the second vacation may be more likely to be selected than the first photo from the first vacation. Also, for example, if a first photo is of a first person, but another photo was provided to the user earlier in the week that was also of the first person, then the first photo may be prevented from being selected.

In some implementations whether identified media is selected to provide to a user may be based on a source of the media. For example, in some scenarios photos of the user and/or of photos of friends of the user may be preferred over other photos. Also, for example, in some scenarios it may be desirable to include at least one photo of the user and to include at least one high quality photo from a public source.

In some implementations whether identified media is selected to provide to a user may be based on determined quality of the image. For example, a highly rated public photo of a point of interest may be more likely to be selected than a poorly rated public photo of the same point of interest. Also, for example, a frequently viewed and/or highly rated photo of the user may be more likely to be provided than a less frequently viewed and/or less highly rated photo of the user. Determination of quality may be based on, for example, automatic analysis of the media (e.g., image analysis of a photo), user ratings, and/or user views.

In some implementations whether identified media is selected to provide to a user may be based on an annotation or other tag of the media. For example, photos that are identified as being primarily of a specific entity type may be preferred in some scenarios. For example, if the triggering event is a user purchase of a book, then photos that are identified as being photos of books may be preferred. Also, for example, if the triggering event is a hobby of the user such as bird watching, then the photos that are identified as being photos being of a type that relate to the hobby, such as images of birds, may be preferred.

In some implementations whether media is selected to provide to a user may be based on a single criteria such as one or more of the criteria described herein. In some implementations whether media is selected to provide to a user may be based on a combination of criteria such as one or more of the criteria described herein. As discussed herein, in some implementations the selection criteria in selecting media to provide to a user may be based on a category of the past event and/or triggering event. For example, one or more of the selection criteria described herein may be weighted more heavily in selecting a photo for a certain category of the past event and/or triggering event and/or may be the only selection criteria in selecting a photo for a certain category. For example, if the triggering event is a hobby of the user, then whether photos are photos of a type that relate to the hobby may be the most heavily weighted selection criteria and/or the only selection criteria in selecting one or more of the photos. Also, for example, if the triggering event is based on a past event that is a significant event of the user, then whether photos are photos from the actual significant event of the user may be the most heavily weighted selection criteria and/or the only selection criteria for photos. Also, for example, if the triggering event is based on the location of the user, then whether photos are photos from near or at the same location of the user may be the most heavily weighted selection criteria and/or the only selection criteria in selecting one or more of the photos.

In some implementations the selection criteria in selecting media to provide to a user may be based on a source of the media. For example, one or more of the selection criteria described herein may be weighted more heavily in selecting a photo that is a photo from a certain source and/or may be the only selection criteria in selecting a photo from a certain source. For example, in selecting a photo that is a publicly available photo that is not a photo of the user, quality of the photo may be weighted more heavily than it is in selecting a photo that is a photo of the user. In some implementations the selection criteria in selecting media to provide to a user may be based on the corpus of identified media from which to select. For example, one or more of the selection criteria described herein may be weighted more heavily in selecting a photo when there are a relatively large number of photos to choose from and/or may be the only selection criteria in selecting a photo. For example, when multiple photos are available that include similar entities, quality of the photos may be weighted more heavily in selecting a photo among the photos that include similar entities.

In some implementations the media selection system 130 identifies one or more additional actions associated with selected media. The additional actions may be presented in combination with the selected media to enable a user to which the selected media is provided to engage in the one or more additional actions. For example, an additional action may be to share one or more of the selected media. For example, a user may be presented with an option to share one or more of the selected media via e-mail, text, social networking, and/or other communications medium. Sharing of the selected media may include sharing a link to the selected media and/or sharing the selected media itself (e.g., attaching a photo to an e-mail). Also, for example, an additional action may be to contact an entity associated with the media, such as an acquaintance that is present in the media and/or a business entity that is present in the media. For example, a photo with an acquaintance of the user may be provided with an option to call the acquaintance (e.g., based on contact information for the acquaintance in data associated with the user), contact the acquaintance via e-mail, contact the acquaintance via a social networking message, etc. Also, for example, an additional action may be to view additional information related to an entity associated with the media, such as an acquaintance that is associated with the media, an event that is associated with the media, and/or a business entity that is associated with the media. For example, a photo from an annual music festival attended by the user in the past may be provided with an option to view additional information related to the music festival such as a link to view the lineup for the upcoming iteration of the annual music festival.

In some implementations, permissions and/or customizations of functionality may be provided. For example, in some implementations, a user may customize what events should constitute past events, what events should constitute triggering events, which photos may be provided to the user, and/or when photos should be provided to the user. For example, a user may specify that only past events that are of a certain category, such as significant past events, should constitute past events. Also, for example, a user may specify that anniversaries of past events should not constitute triggering events. Also, for example, the user may specify that only triggering events based on location and time should constitute triggering events. Also, for example, the user may specify that only personal photos of the user should be provided to the user. Also, for example, the user may specify that photos should only be provided to the user during certain time periods and/or when the user is engaged or not engaged in certain activities. Also, for example, a user may prevent images from certain time periods from being displayed, prevent images of certain categories of past events from being displayed, and/or may prevent images containing certain entities from being displayed.

In some implementations, event determination system 120 and/or media selection system 130 may additionally and/or alternatively utilize information about historical usage in determining which events constitute past events and/or triggering events and/or in determining which media to provide to a user. Historical usage may be specific to the user and/or based on historical usage of other users such as other users similar to the user. For example, event determination system 120 may receive feedback information from the user indicating whether the user enjoyed being provided media in response to a certain triggering event and adjust whether future events are determined to be triggering events based on such feedback. For example, the event determination system 120 may receive information that indicates the user quickly dismisses provided media in response to location based triggering events and prevent determination of future triggering events based on location for the user.

Feedback information from a user that indicates the user does not enjoy provided media may include, for example: information indicating a short viewing time associated with the provided media (e.g., exiting a user interface in which the media is provided within X seconds); a negative user action directed at the media such as swiping away the media, giving a negative rating to the media such as a thumbs down; and/or a lack of selection of the provided media (e.g., selection to view a larger version of a photo, to view all or a portion of a video, to share the media with one or more acquaintances). Feedback information from a user that indicates the user does enjoy provided media may include, for example: information indicating a long viewing time associated with the provided media (e.g., exiting a user interface in which the media is provided after X seconds); a positive user action directed at the media such as giving a positive rating to the media such as a thumbs up; and/or a selection of the provided media such as viewing a larger version of a photo, viewing all or a portion of a video, sharing media with one or more acquaintances, etc.

In some implementations, event determination system 120 and/or media selection system 130 may additionally and/or alternatively utilize changes in data associated with a user and/or data associated with the media in determining which events constitute past events and/or triggering events and/or in determining which media to provide to a user. For example, event determination system 120 may determine a user's disassociation with an acquaintance based on changes to the user's social networking profile, the user's contacts list, and/or other data associated with the user. Based on such disassociation, any past events, triggering events, and/or media based on the disassociated acquaintance may be suppressed. Also, for example, event determination system 120 may determine a user's disassociation with a hobby based on a change to the user profile of the user that formerly identified the user as associated with the hobby. Based on such disassociation, any past events, triggering events, and/or media based on the disassociated hobby may be suppressed. Also, for example, a user may delete one or more photos of the user. Based on such deletion, any past events and/or triggering events based on the deleted photos may be suppressed.

In some implementations, one or more components depicted in FIG. 1 may not be present and/or one or more additional components may be present. For example, event determination system 120 and/or media selection system 130 may be omitted. Also, for example, a separate system may be provided for providing selected media to the computing device 105. In some implementations, one or more components depicted in FIG. 1 may be combined into a single component. For example, in some implementations event determination system 120 and/or media selection system 130 may be combined into a single system.

Figure 2:
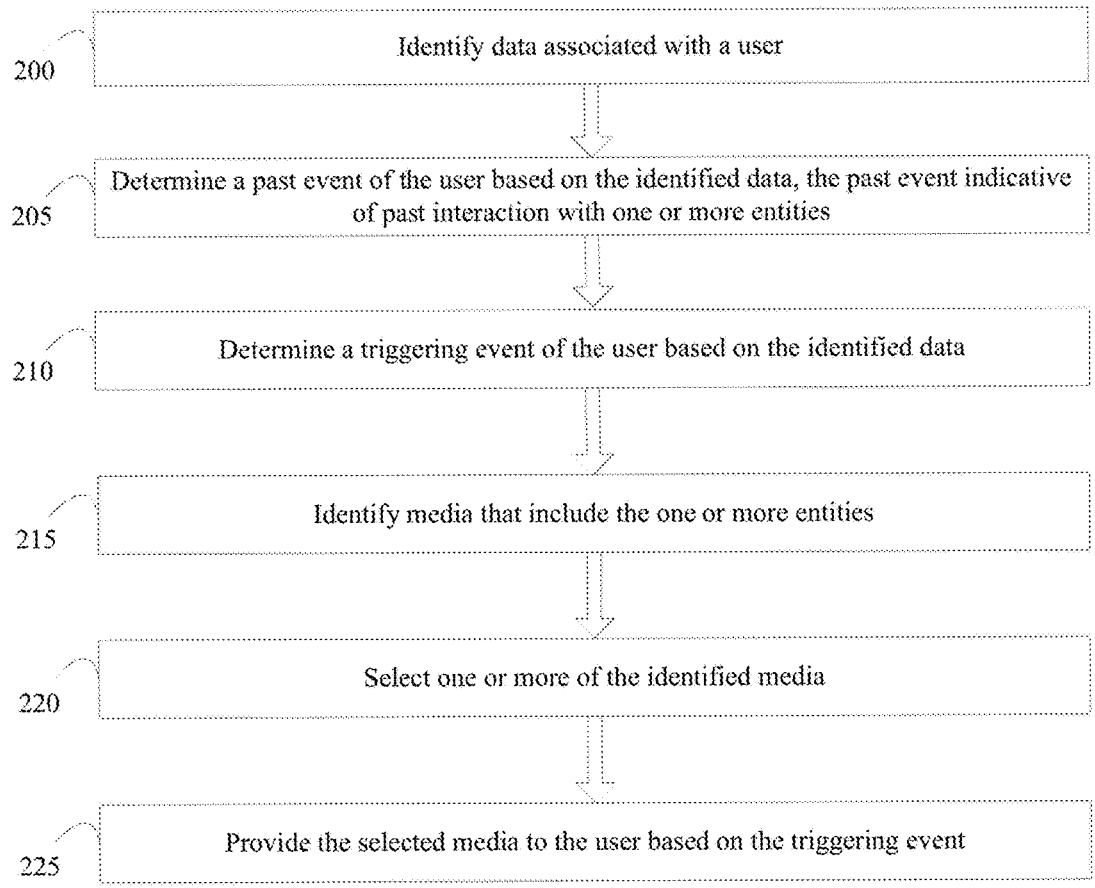
FIG. 2 is a flow chart illustrating an example method of providing media to a user based on a triggering event.

Referring to FIG. 2, a flow chart illustrating an example method of providing media to a user based on a triggering event is provided. Other implementations may perform the steps in a different order, omit certain steps, and/or perform different and/or additional steps than those illustrated in FIG. 2. The steps of the method illustrated in FIG. 2 may be performed by one or more components illustrated in FIG. 1. For example, the event determination system 120 and/or the media selection system 130 may perform the steps of the method of FIG. 2.

At step 200, data associated with the user is identified. For example, data associated with the user may be identified from one or more databases such as content database 115 of FIG. 1.

At step 205, a past event of the user is determined based on the identified data. A past event is an event associated with a past interaction of the user with one or more entities identified based on the user data. For example, a past event may be a past meeting with a friend determined based on social network notifications of the user concerning the past meeting and/or based on presence of the friend in one or more contacts lists of a user.

At step 210, a triggering event of the user is determined based on the identified data. A triggering event is some identifiable occurrence after a past event that is associated with the past event. For example, a triggering event may be identified based on a calendar entry of the user that shows an anticipated future meeting with a friend of the user. The triggering event may be determined to be associated with the past event based on the friend also being associated with the past event. For example, the past event may be a past meeting with the friend based on presence of the friend in one or more contacts lists of the user. In some implementations the triggering event is based on a passage of time since the past event. In some implementations the triggering event is based on one or more present or anticipated actions of the user that are associated with the past event and are identified based on the user data. In some implementations the triggering event may be indicative of present and/or future interactions of the user with one or more entities of the past event.

At step 215, one or more media that include the one or more entities identified at step 205 may be identified. For example, one or more photos that include the one or more entities related to the past event may be identified from one or more databases such as content database 115. For example, for the past event that is a past meeting with a friend, one or more photos of the friend may be identified.

At step 220, one or more of the identified media are selected. Selection of the one or more media may be based on one or more selection criteria such as those described herein. For example, selection of photos may be based on age of the photos, quality of the photos, one or more entities in the photos, uniqueness of the photos, and/or diversity of the photos. In some implementations the selection of the media may include one or more of the steps of the method of FIG. 3 described herein.

At step 225, the selected media is provided to the user in response based on the triggering event. For example, where the triggering event is a calendar appointment the selected media may be provided to the user in response to creation of the calendar appointment, a time prior to the appointment, and/or at the time of the appointment. Also, for example, where the triggering event is based on location of a user, the selected media may be provided to the user in response to location data of the user indicating presence at the location or location data of the user indicating presence near the location. Also, for example, where the triggering event is based on an e-mail of a user, the selected media may be provided to the user in response to the user reading the e-mail, after a period of time has elapsed since the user read the e-mail, or based on a time and/or date mentioned in the e-mail.

Figure 3:
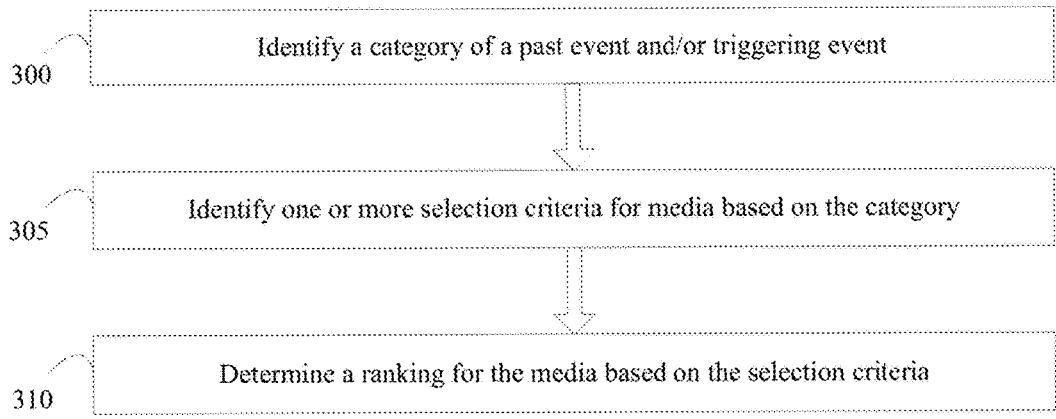
FIG. 3 is a flow chart illustrating an example method of determining a ranking for media based on one or more selection criteria, wherein the selection criteria are based on a category of a past event and/or triggering event.

Referring to FIG. 3, a flow chart illustrating an example method of determining a ranking for media based on one or more selection criteria is provided, wherein the selection criteria are based on a category of a past event and/or triggering event. Other implementations may perform the steps in a different order, omit certain steps, and/or perform different and/or additional steps than those illustrated in FIG. 3. In some implementations, one or more steps of the illustrated method may be performed by one or more of the components of FIG. 1 such as media selection system 130.

At step 300, a category of a past event and/or a triggering event is identified. For example, the category of the past event may be one or more types of past events described herein such as a significant past event, a past visit of a user to a location, a past meeting with a friend, a past purchase, a hobby, and/or a past photo. Also, for example, the category of the triggering event may be based on the identified occurrence after the past event. For example, triggering event categories may include a triggering event based on passage of time since the past event, a triggering event based on one or more anticipated actions of the user, triggering events based on receipt of an electronic communication, triggering events based on a calendar entry, and/or triggering events based on the ending of a past event. Some past events and/or triggering events may optionally be associated with more than one category.

At step 305, one or more selection criteria for media are identified based on the one or more categories identified at step 300. Selection criteria may include those discussed herein with respect to FIG. 1. For example, one or more of the selection criteria may be weighted more heavily in selecting a photo for a certain category of the past event and/or triggering event and/or may be the only selection criteria in selecting a photo for a certain category. For example, if the triggering event is a hobby of the user, then whether photos are photos of a type that relate to the hobby may be the most heavily weighted selection criteria and/or the only selection criteria in selecting one or more of the photos. Also, for example, if the triggering event is based on a past event that is a significant event of the user, then whether photos are photos from the actual significant event of the user may be the most heavily weighted selection criteria and/or the only selection criteria for photos. Also, for example, if the triggering event is based on the location of the user, then whether photos are photos from near or at the same location of the user may be the most heavily weighted selection criteria and/or the only selection criteria in selecting one or more of the photos. Also, for example, if the triggering event is based on a past purchase of the user, then whether photos are photos that conform to past purchases of the user of the same type may be the most heavily weighted selection criteria and/or the only selection criteria in selecting one or more of the photos. For example, if the triggering event is based on the presnce of a user in a wine store, then the selected photos may only be those photos that conform to past purchases of wine by the user (e.g., identified images of wine labels that conform to previously purchased bottles of wine as identified from one or more past events of the user).

At step 310, a ranking for the media is determined based on the selection criteria. In some implementations, the ranking may be a relevance score for each of the media determined based on the selection criteria. For example, in some implementations a score may be determined for each of the media based on the selection criteria. The score may be indicative of relevance of the media based on the identified category. In some implementations the ranking may be based on filtering out one or more of the media that don't conform to the selection criteria and utilizing a preexisting ranking of the media to rank the remaining media. Additional and/or alternative ranking techniques may be utilized. The determined ranking of the media may be utilized in selecting one or more of the media to provide to a user.

Figure 4:
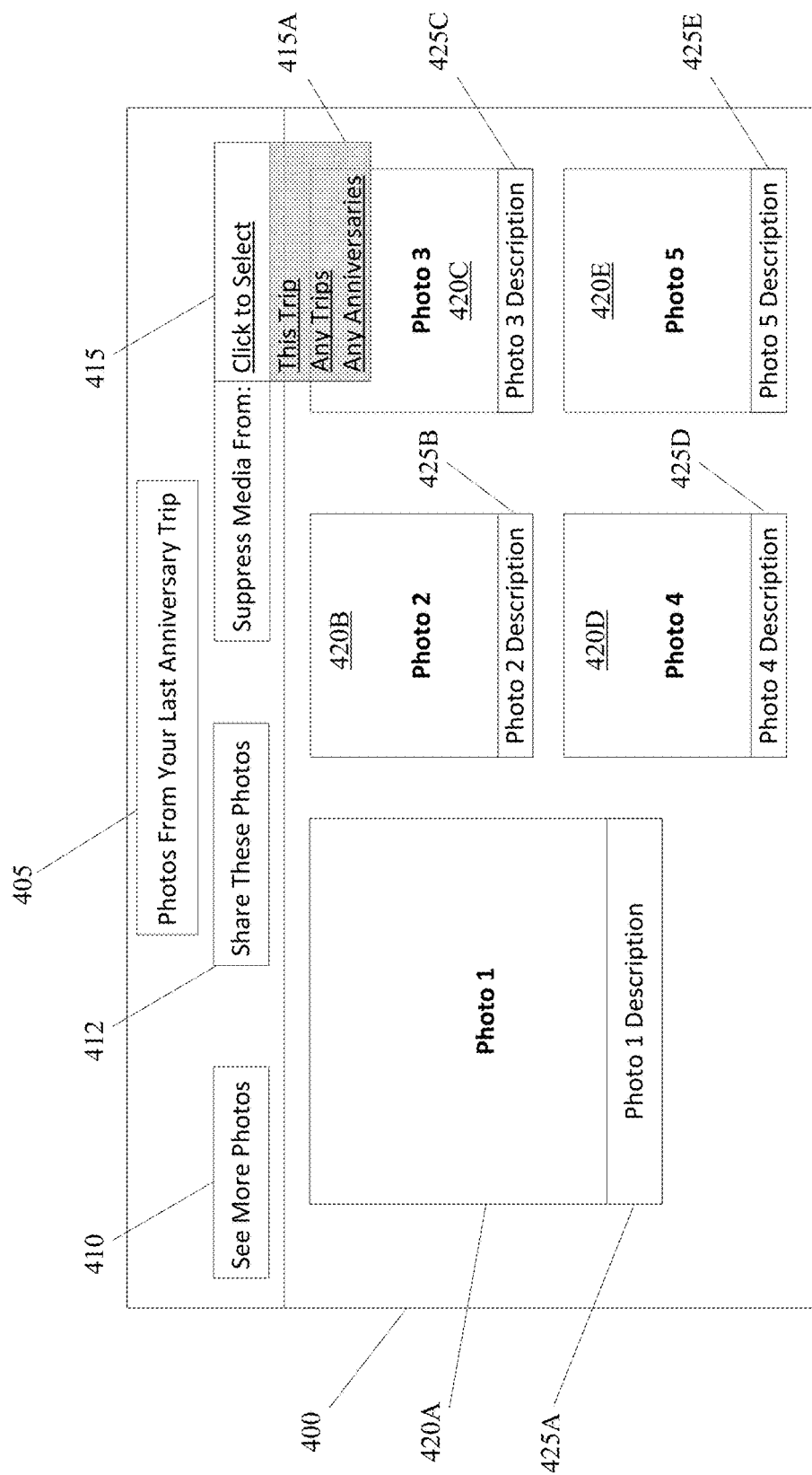
FIG. 4 illustrates an example graphical user interface for displaying media to a user.

Referring to FIG. 4, an example graphical user interface for displaying media to a user is provided. The displayed graphical user interface includes a display 400 that may be provided via browser 110 or other application executing on computing device 105 of FIG. 1. The media includes photos 420A-E that are related to a past event anniversary trip of the user. The media may be displayed to the user, for example, in response to a triggering event based on passage of time since the anniversary trip of the user. The photos 420A-E are provided with respective descriptions 425A-E that may provide information related to the photos. In some implementations the descriptions 425A-E may be based on annotations provided with the photos. In some implementations one or more descriptions 425A-E may provide an indication of one or more properties of the photo such as, for example, the source of the photo, one or more entities in the photo, a date of the photo, and/or a location of the photo. The photos 420A-E may be selected utilizing one or more criteria such as selection criteria described herein.

Display 400 also includes a title bar 405 indicating that the media being displayed is media from the user's last anniversary trip. The title bar 405 may be populated based on information associated with the past event. Interface element 410 may be selected by the user to retrieve additional related media beyond those shown in FIG. 4. Interface element 412 may be selected by the user to enable the additional action of sharing of the photos 420A-E via e-mail, text, social networking, and/or other communications medium. Sharing of the photos 420A-E may include sharing a link to the photos 420A-E and/or sharing the photos 420A-E (e.g., attaching the photos 420A-E to an e-mail). Interface element 415 may be selected to present a drop down menu 415A listing certain past events. One or more of the past events of the drop down menu 415A may be selected to prevent any media related to the selected past events from being provided to the user in the future. The past events of the drop down menu 415A include the particular past anniversary trip for which the photos 420A-E are being provided ("This Trip") and also include certain categories of past events such as any past trips ("Any Trips") and any past anniversaries ("Any Anniversaries"). For example, selecting "This Trip" would prevent any media related to the particular past anniversary trip from being provided to the user in the future, whereas selecting "Any Anniversaries" would prevent any media related to an anniversary of a past event from being provided to the user in the future.

Figure 5:
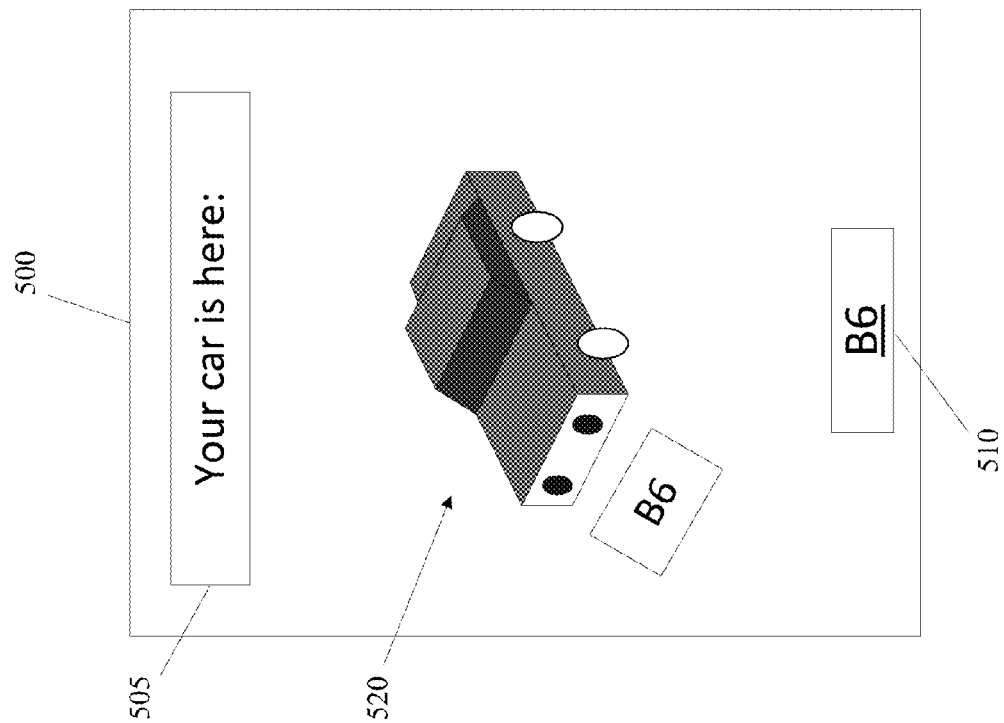
FIG. 5 illustrates another example graphical user interface for displaying media to a user.

Referring to FIG. 5, another example graphical user interface for displaying media to a user is provided. The displayed graphical user interface includes a display 500 that may be provided via browser 110 or other application executing on computing device 105 of FIG. 1. The media includes a photo 520 that is related to a past event location of the user. The photo 520 is a picture of the user's car in a parking lot that was previously taken by the user and flagged by the user as a past event. The previously taken photo was associated with a location at which the photo was taken (e.g., based on GPS data from the device taking the photo). The photo 520 may be displayed to the user, for example, in response to a triggering event based on presence of the user at or near the location at which the photo was taken. For example, the photo 520 may have been taken in an airport parking lot and the photo 520 may automatically be provided to the user based on the user returning to a location near the location at which the photo was taken. The photo shows a parking spot indicator for the car (B6). An information box 510 is provided that also shows the parking spot indicator (B6) for the user in a more prominent fashion. The parking spot indicator provided in the information box 510 may be identified based on, for example, image analysis of the photo 520 and/or user entry when the user flagged the photo 520 as a past event. For example, upon taking the photo 520 and indicating the photo should be flagged as a past event, the user may be prompted to enter additional information related to the photo 520. Display 500 also includes a title bar 505 indicating that the photo 520 provides an indication of the location of the user's car.

Figure 6:
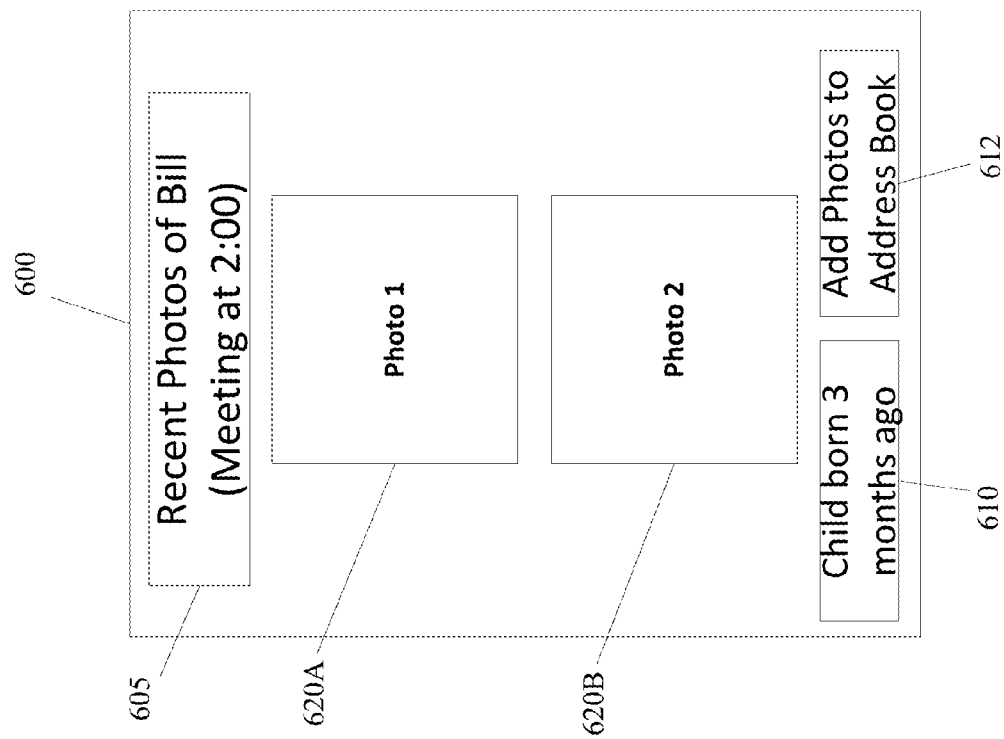
FIG. 6 illustrates another example graphical user interface for displaying media to a user.

Referring to FIG. 6, another example graphical user interface for displaying media to a user is provided. The displayed graphical user interface includes a display 600 that may be provided via browser 110 or other application executing on computing device 105 of FIG. 1. The media includes photos 620A and 620B that are related to an individual, Bill, whom with the user has an upcoming meeting. The photos 620A and 620B are recent photos of Bill and may be selected based on one or more selection criteria such as those described herein. The photos 620A and 620B may be displayed to the user, for example, in response to a triggering event based on a calendar entry that indicates a future meeting with Bill. The information box 610 provides additional information about Bill that indicates Bill recently had a child born three months ago. The information in information box 610 may be obtained, for example, via one or more databases and/or via one or more media related to Bill. For example, the identified media for Bill may have included a large number of photos from 3 months ago with tags and/or comments that identified the birth of a child. Display 600 also includes a title bar 605 indicating that the photos 620A and 620B are recent photos of Bill and that the user has an upcoming meeting with Bill at 2:00. Display 600 also includes an interface element 612 that may be selected by the user to perform the additional action of adding the photos 620A and 620B to an entry associated with Bill in an address book of the user.

Figure 7:
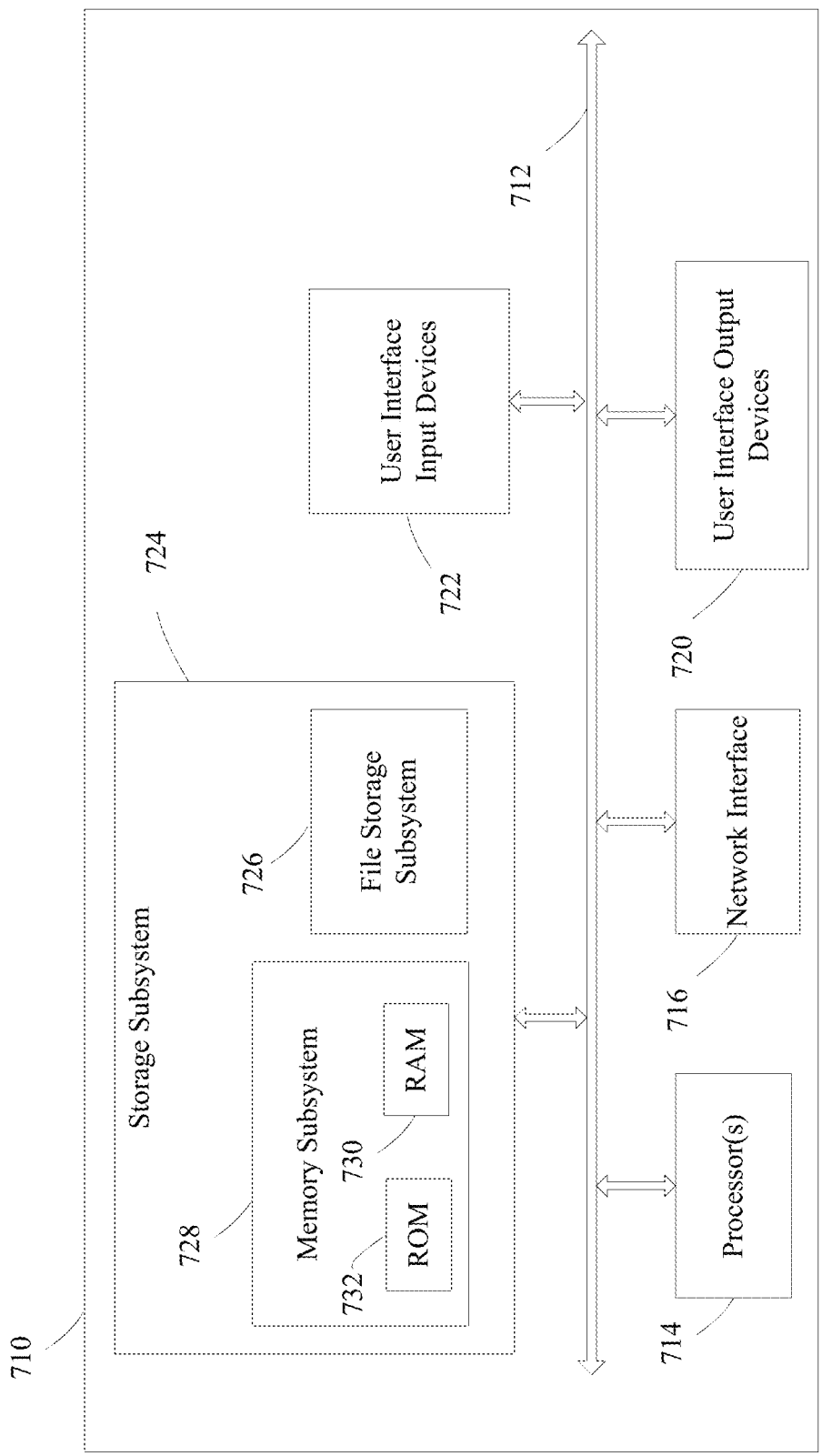
FIG. 7 illustrates a block diagram of an example computing device.

FIG. 7 is a block diagram of an example computing device system 710. Computing device system 710 typically includes at least one processor 714 which communicates with a number of peripheral devices via bus subsystem 712. These peripheral devices may include a storage subsystem 724, including, for example, a memory subsystem 726 and a file storage subsystem 728, user interface input devices 722, user interface output devices 720, and a network interface subsystem 716. The input and output devices allow user interaction with computing device system 710. Network interface subsystem 716 provides an interface to outside networks and is coupled to corresponding interface devices in other computing device systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device system 710 to the user or to another machine or computing device system.

Storage subsystem 724 stores programming and data constructs that provide the functionality of some or all of the modules described herein. For example, the storage subsystem 724 may include the logic to determine events and/or select media to provide to a user based on a triggering event.

These software modules are generally executed by processor 714 alone or in combination with other processors. Memory 726 used in the storage subsystem can include a number of memories including a main random access memory (RAM) 730 for storage of instructions and data during program execution and a read only memory (ROM) 732 in which fixed instructions are stored. A file storage subsystem 728 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 728 in the storage subsystem 724, or in other machines accessible by the processor(s) 714.

Bus subsystem 712 provides a mechanism for letting the various components and subsystems of computing device system 710 communicate with each other as intended. Although bus subsystem 712 is shown schematically as a single bus, alternative implementations of the bus subsystem may use multiple busses.

Computing device system 710 can be of varying types including a workstation, server, computing cluster, blade server, server farm, or any other data processing system or computing device. Due to the ever-changing nature of computing devices and networks, the description of computing device system 710 depicted in FIG. 7 is intended only as a specific example for purposes of illustrating some implementations. Many other configurations of computing device system 710 are possible having more or fewer components than the computing device system depicted in FIG. 7.

While several inventive implementations have been described and illustrated herein, a variety of other means and/or structures for performing the function and/or obtaining the results and/or one or more of the advantages described herein may be utilized, and each of such variations and/or modifications is deemed to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
   identifying data associated with a user, the data including data non-associated with media that is indicative of user interactions with one or more entities;
   determining a past event of the user based on the data non-associated with media, the past event indicative of past interaction of the user with one or more past event entities of the entities;
   determining a triggering event based on the identified data, the triggering event occurring after the past event and including one or more triggering event actions associated with one or more triggering event entities,
      wherein the triggering event indicates present or anticipated performance by the user of the triggering event actions associated with the triggering event entities,
      wherein the triggering event entities include one or more that are in addition to the past event entities, and
      wherein the past event entities include at least one past event entity that is in addition to the triggering event entities;
   determining an association between the past event and the triggering event;
   identifying media to provide in response to the triggering event, including identifying, based on the determined association, at least some of the media based on the media including the at least one past event entity that is in addition to the triggering event entities;
determining a ranking for the identified media based on one or more selection criteria;
selecting one or more of the identified media based on the ranking; and
providing the selected media for presentation via a computing device of the user in response to the triggering event,
wherein providing the selected media for presentation via the computing device of the user in response to the triggering event is based on determining that at least a threshold time period has elapsed since one or more other media have been provided, in response to another triggering event, that include the past event entity of the selected media that is in addition to the triggering event entities.

2. The method of claim 1, wherein the determining the ranking for the identified media is based at least in part on relevance of the identified media to the triggering event entities.

3. The method of claim 1, wherein identifying the media based on the media including the past event entity includes:
identifying metadata associated with the media; and
matching the metadata to the past event entity.

4. The method of claim 3, wherein matching the metadata to the past event entity includes identifying a mapping between the metadata and the past event entity in a database.

5. The method of claim 4, wherein the media includes a given photo, and wherein metadata for the given photo of the media includes at least one of a title of an album to which the given photo belongs, a photo tag associated with the given photo, and entity recognition metadata based on image analysis of the given photo.

6. The method of claim 1, further comprising:
identifying a category of the triggering event; and
identifying the one or more selection criteria based on the category of the triggering event.

7. The method of claim 6, wherein the category of the triggering event is a location based category and wherein the selection criteria includes criteria related to a location associated with the media.

8. The method of claim 6, wherein the selection criteria for a first category of the category includes a plurality of selection criteria and associated weightings and wherein the selection criteria for a second category of the category includes one or more same of the selection criteria with an associated weighting that is unique from the associated weighting of the same of the selection criteria for the first category.

9. The method of claim 1, wherein determining the ranking for the identified media includes identifying acquaintances of the user and increasing the likelihood of selecting a given photo of the media if the given photo includes one or more of the identified acquaintances of the user.

10. The method of claim 9, wherein one or more of the identified acquaintances of the user are identified based on being included in the past event entities of the determined past event.

11. The method of claim 1, wherein determining the triggering event of the user based on the identified data includes identifying multiple sources of data indicative of at least one of present and future interaction of the user with the one or more triggering event entities.

12. The method of claim 11, wherein determining an association between the past event and the triggering event includes determining an association between one or more of the triggering event entities and the past event entities.

13. The method of claim 1, wherein determining the triggering event of the user based on the identified data includes identifying a frequency of occurrence of the one or more triggering event actions by the user is indicative of rare occurrence.

14. The method of claim 1, wherein the past event entities include a location of the past event and one or more acquaintances that attended the past event.

15. The method of claim 1, wherein the past event entities include an acquaintance entity of one or more acquaintances that attended the past event and wherein the triggering event is based on current or future interaction of the user with the acquaintance entity.

16. A method, comprising:
identifying data associated with a user;
determining a triggering event of the user based on the identified data, the triggering event associated with one or more past, current, or future actions of the user;
determining an association between the triggering event and one or more selected entities;
identifying media based on each of the media including one or more of the selected entities;
selecting one or more of the identified media, wherein selecting a given media of the identified media comprises:
identifying one or more given entities included in the given media, the given entities including one or more of a person and a place and the given entities being in addition to the selected entities used in identifying the media; and
selecting the given media based on whether at least a threshold time period has elapsed since one or more other media have been provided, in response to another triggering event, that include one or more of the given entities; and
providing the selected media for presentation via a computing device of the user based on the triggering event.

17. The method of claim 16, wherein the triggering event is based on an anniversary date of a past event.

18. The method of claim 16, wherein determining the triggering event of the user based on the identified data includes identifying multiple sources of data indicative of at least one of present and future interaction of the user with the selected entities.

19. The method of claim 18, wherein determining the triggering event of the user based on the identified data includes determining a past event indicative of interaction of the user with the selected entities.

20. The method of claim 16, wherein the given media is only provided to the computing device if the threshold time period has elapsed.

21. The method of claim 16, wherein the triggering event is a recurring event associated with one or more past actions of the user, and wherein the triggering event becomes less frequent in occurrence as time from the past event increases.

* * * * *